June 26, 1962
R. F. RISSE
3,041,055
ROTATABLE CUTTER HEAD
Filed July 13, 1959
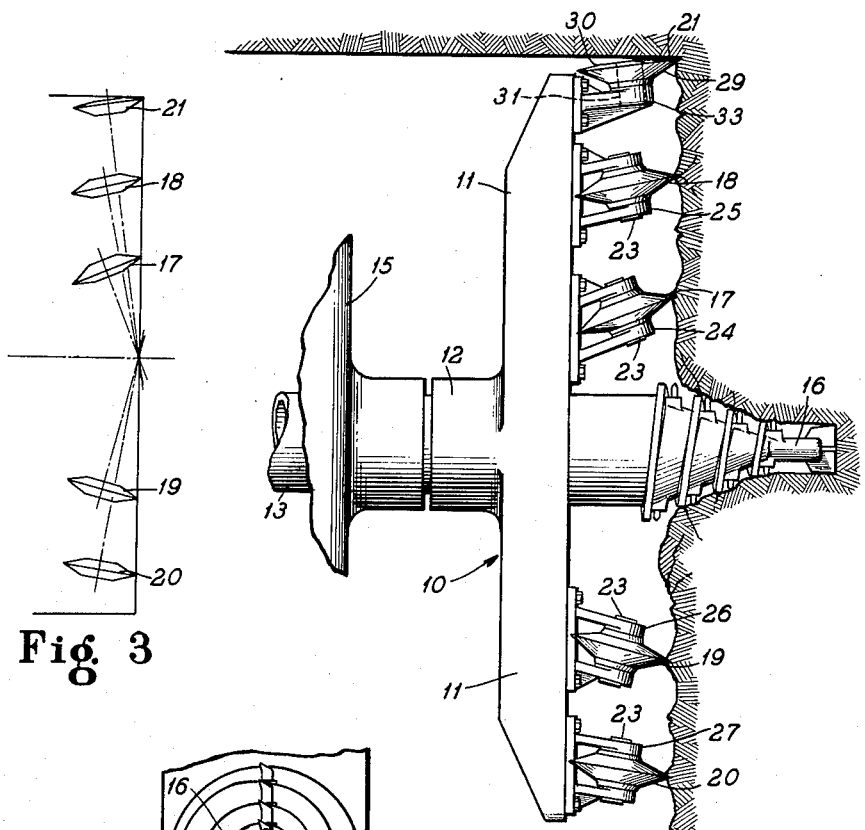
Fig. 3
Fig. 1
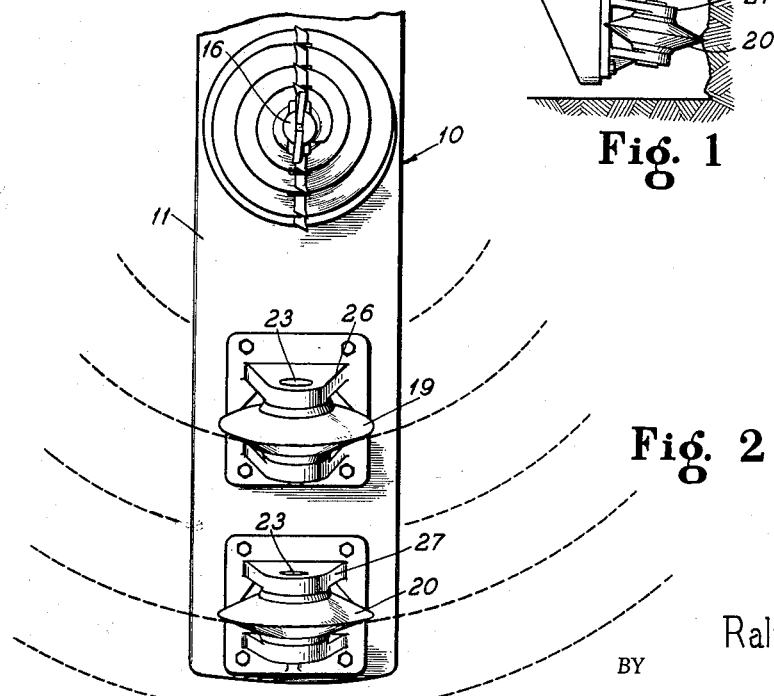
Fig. 2
INVENTOR.
Ralph F. Risse
BY
ATTORNEYS 329,041,055
Patented June 26, 1962

3,041,055
ROTATABLE CUTTER HEAD
Ralph F. Risse, Chicago, Ill., assignor to Goodman Manufacturing Company, Chicago, Ill., a corporation of Illinois
Filed July 13, 1959, Ser. No. 826,509
1 Claim. (Cl. 262—26)

This invention relates to improvements in rotary boring heads of a type adapted to bore out a complete working face in coal, rock and the like.

The boring head of the present invention is particularly adapted to bore out the working face by the use of rotary disk cutters alone, without the use of bits, heretofore used in rotary boring machines of the tunneling type, and is so arranged as to reduce the drag of boring by positioning the roller disk cutters at leading angles with respect to the coal face for rotation about axes intersecting a common point at the coal face, as the roller disk cutters come into engagement with the coal face, and thereby positioning the cutters to rotate about the coal face in true circumferential paths, to cut into the coal face with no side slippage or drag.

A principal object of the present invention is to provide an improved form of rotary boring head so arranged as to increase the efficiency of boring and to reduce the torque required to rotatably drive the boring head.

A further object of the invention is to improve upon the rotary boring heads heretofore used for cutting in coal, rock and the like, by utilizing a series of radially spaced rotary disk cutters inclined at leading angles with respect to the coal face and rotatable about axes intersecting a common point at the axis of rotation of the boring head and in a plane common to the cutting extremities of the rotary disk cutters.

A further object of the invention is to provide an improved form of rotary boring head in which a plurality of rotary disk cutters of the same diameter are mounted on rotatable supports in radial and circumferentially spaced relation with respect to each other, and in which the rotary disk cutters all rotate about axes inclined at leading angles with respect to the coal face and intersecting a common point at the axis of rotation of the rotary disk cutter.

These and other objects of the invention will appear from time to time as the following specification proceeds and with reference to the accompanying drawing wherein:

FIGURE 1 is a fragmentary view in side elevation of a rotary boring head constructed in accordance with the invention, showing the boring head in the operation of making a boring cut in a mine face;

FIGURE 2 is a fragmentary plan view of the boring head shown in FIGURE 1; and

FIGURE 3 is a diagrammatic view illustrating the angular positioning of the rotary disk cutters with respect to the mine face.

In the embodiment of the invention illustrated in the drawing, 10 generally designates a rotary boring head having a plurality of radially extending arms 11 extending radially from a hub 12 mounted on and rotatably driven from a longitudinally extending shaft 13 rotatably supported in a gear casing 15 of a continuous mining machine and the like (not shown).

A pilot cutter 16 projects forwardly of the center of the boring head as is usual with such boring heads.

As herein shown, two diametrically opposed radial arms 11 are provided, it being understood that any number of arms desired may be provided dependent upon the spacing of the cutting surfaces required to mine a particular type of material.

A series of rotary disk cutters 17, 18, 19, 20 and 21 are mounted on the front faces of the arms 11 for cutting non-tracking annular grooves in the mine face.

The rotary disk cutters 17 to 20 inclusive, are each of a similar construction, but are inclined at different angles with respect to the mine face, as will hereinafter more clearly appear. Each rotary disk cutter is journalled on a separate radially extending shaft 23 and is generally V-shaped in cross-section, having opposite frusto-conical faces, the juncture of which faces forms a rotatable cutting edge pitched at angles leading the rotary disk cutters to cut non-tracking annular grooves in the mine face, as they travel thereabout.

The rotary disk cutters 17, 18, 19 and 20 are mounted in brackets 24, 25, 26 and 27 respectively, bolted or otherwise secured to the front faces of the arms 11 and projecting forwardly therefrom. As shown in FIGURE 1, the brackets 24, 25, 26 and 27, pitch the shafts 23 and the respective cutters 17, 18, 19 and 20 at leading angles with respect to the coal face, to rotate about axes extending radially toward the center of rotation of the boring head and intersecting a common point substantially at the mine face, as the rotary disk cutters come into cutting engagement with the mine face.

The cutter 21 is a peripheral disk cutter and has a relatively long inner frusto-conical face 29 and a shorter outer frusto-conical face 30 extending at a flatter angle than the inner face, and positioning the cutting edge of the disk to make a peripheral cut in the tunnel face and cut clearance for the arms 11.

The cutter 21 is journalled on a shaft 31, mounted in a bracket 33 bolted or otherwise secured to the forward face of the arm 11, adjacent the periphery thereof, and projecting forwardly therefrom.

The bracket 33 supports the shaft 31 in position to support the cutter 21 for rotation about an axis inclined at a leading angle with respect to the coal face and intersecting the point of intersection of the axes of rotation of the cutters 17, 18, 19 and 20.

It will be understood from FIGURES 1 and 3 that the rotary cutter disks 17 to 21 all rotate about radially extending axes inclined at different angles with respect to the coal face and intersecting a common point at the coal face substantially in alignment with the cutting peripheries of said cutters.

The cutters 17 to 21 thus rotate about the mine face in non-tracking annular paths and the positioning of the intersection of the extended axes of rotation of the cutters at a common point at the coal face, positions the respective cutters to rotate about the mine face in true circular paths and to be led into the coal face to cut non-tracking annular grooves therein with a minimum of side slippage and with a minimum of drag on the boring head.

It may further be seen that with the cutter arrangement shown, the reduction in side drag on the cutters also reduces the side thrusts on the supports therefor increasing the life of the bearing supports as well as the cutting life of the cutters, and increasing the efficiency of penetration of the mine face.

While I have herein shown and described one embodiment of my invention, it will be understood that various changes and modifications in the invention may be effected without departing from the spirit and scope of the invention as defined by the claim appended hereto.

I claim as my invention:

A rotary boring head comprising at least one rotatable boring arm rotatable about a horizontal axis, a central pilot cutter projecting forwardly of said boring arm, a plurality of radially spaced rotary disk cutters mounted on said boring arm, said disk cutters each having opposite frusto-conical faces, the juncture of which faces forms a peripheral cutting edge, said cutting edges of said disk cutters being of the same diameter, bracket means mounting said rotary disk cutters on said boring arm and pitching said disk cutters to cut non-tracking grooves in a working face, said bracket means mounting said disk cutters for rotation about non-parallel generally radial inclined axes inclined outwardly from said boring arm as they approach the axis of rotation thereof and intersecting the axis of rotation of said boring arm at a common point in advance of said boring arm and in the general plane of engagement of the cutting peripheries of said rotary disk cutters with the working face.

References Cited in the file of this patent

UNITED STATES PATENTS

| | | |
|---|---|---|
| 1,708,288 | Wadsworth | Apr. 9, 1929 |
| 2,550,202 | Robbins | Apr. 24, 1951 |